(12) United States Patent
Molaro et al.

(10) Patent No.: US 8,208,215 B2
(45) Date of Patent: *Jun. 26, 2012

(54) TECHNIQUES FOR EMULATING SEQUENTIAL DEVICE WITH CONSTRAINED DISK DRIVE

(75) Inventors: Donald Joseph Molaro, Cupertino, CA (US); Zvonimir Bandic, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/368,929

(22) Filed: Feb. 10, 2009

(65) Prior Publication Data

US 2010/0205623 A1 Aug. 12, 2010

(51) Int. Cl.
*G11B 19/02* (2006.01)
*G11B 5/02* (2006.01)
*G11B 17/08* (2006.01)

(52) U.S. Cl. ............ 360/71; 360/55; 360/98.07

(58) Field of Classification Search .............. None
See application file for complete search history.

(56) References Cited

U.S. PATENT DOCUMENTS

| | | | | |
|---|---|---|---|---|
| 3,940,794 | A * | 2/1976 | Griffiths et al. | 360/98.03 |
| 4,092,681 | A * | 5/1978 | Dix et al. | 360/75 |
| 4,185,311 | A * | 1/1980 | Gyi et al. | 360/98.03 |
| 4,250,529 | A * | 2/1981 | Kleczkowski et al. | 360/98.08 |
| 6,105,104 | A * | 8/2000 | Guttmann et al. | 711/4 |
| 6,185,063 | B1 * | 2/2001 | Cameron | 360/78.04 |
| 6,879,454 | B2 * | 4/2005 | Winarski et al. | 360/60 |
| 6,967,810 | B2 | 11/2005 | Kasiraj et al. | |
| 7,031,103 | B2 * | 4/2006 | Yoo | 360/97.01 |
| 7,383,560 | B2 * | 6/2008 | Edwards | 720/725 |
| 7,760,230 | B2 * | 7/2010 | Russell et al. | 348/143 |
| 7,986,491 | B2 * | 7/2011 | Albrecht et al. | 360/98.07 |
| 2009/0310242 | A1 * | 12/2009 | McLeod et al. | 360/55 |

OTHER PUBLICATIONS

U.S. Appl. No. 12/248,117, filed Oct. 9, 2008, Albrecht et al.
David Peterson, editor, "Information technology—SCSI Stream Commands—3 (SSC-3)," Working Draft, Project T10/1611-D, Revision 04a, Jan. 28, 2008, pp. 1-214.
Ralph O. Weber, editor, "Information technology—SCSI Primary Commands—3 (SPC-3)," Project T10/1416-D, Revision 23, May 4, 2005, pp. 1-470.
Noud Snelder, editor, "Information technology—SCSI Media Changer Commands—3 (SMC-3)," Working Draft American National Standard, Project T10/1730-D, Revision 12, Sep. 4, 2008, pp. 1-91.

* cited by examiner

*Primary Examiner* — Andrew L Sniezek
(74) *Attorney, Agent, or Firm* — Steven J. Cahill (57) ABSTRACT

A disk drive apparatus includes at least one disk, a head-arm assembly, and a controller circuit. The head arm assembly includes at least one read/write head. The head-arm assembly is movable to enable the read/write head to access a writable surface of the disk. The controller circuit also causes the read/write head to record data on the writable surface of the disk in a write append format.

21 Claims, 6 Drawing Sheets

TECHNIQUES FOR EMULATING SEQUENTIAL DEVICE WITH CONSTRAINED DISK DRIVE

BACKGROUND OF THE INVENTION

The present invention relates to disk drives, and more particularly, to techniques for emulating a sequential device with a constrained disk drive.

Disk drive devices include devices that write data to and read data from magnetic hard disks and devices that write data to or read data from optical disks, such as compact discs and digital video discs.

BRIEF SUMMARY OF THE INVENTION

According to some embodiments of the present invention, a disk drive apparatus includes at least one disk, a head-arm assembly, and a controller circuit. The head arm assembly includes at least one read/write head. The head-arm assembly is movable to enable the read/write head to access a writable surface of the disk. The controller circuit causes the read/write head to record data on the writable surface of the disk in a write append format. In one embodiment, the controller circuit may cause the read/write head to record data on the writable surface of the disk using shingled writing.

According to other embodiments, a disk drive apparatus includes disks in a stack. Each of the disks has at least one writable surface. A disk separator is movable for separating selected axially-adjacent disks. Each pair of axially-adjacent disks defines an axial gap in the stack when the disks in a pair are separated. A head-arm assembly includes an arm and at least one read/write head attached to the arm. The head-arm assembly is movable into the axial gap to enable the read/write head to access a writable surface of at least one of the disks. The disk drive apparatus is configured to access only the writable surfaces of the disks that are accessible within the axial gap. The writable surfaces accessible within the axial gap are less than all of the writable surfaces in the stack. The disk drive apparatus is configured to store data on the writable surfaces of the disks in a write append format.

Various objects, features, and advantages of the present invention will become apparent upon consideration of the following detailed description and the accompanying drawings.

DETAILED DESCRIPTION OF THE INVENTION

Some embodiments of the present invention include a constrained hard disk drive (HDD). A constrained hard disk drive (HDD) can be, for example, an HDD with disk stacking or an HDD without disk stacking that uses shingled recording. A constrained HDD can also be a stacked HDD that uses shingled recording.

Magnetic recording hard disk drives (HDDs) have a stack of rigid magnetic recording disks rotated by a spindle motor, and an actuator that moves the read/write heads across the surfaces of the rotating disks, with each disk surface being accessed by an associated read/write head. The disks in the stack are in a fixed position relative to one another and are not movable axially, i.e., in a direction parallel to the axis of rotation of the spindle motor. Each read/write head is formed on an air bearing slider attached to one end of a suspension, and each suspension is attached at its other end to a rigid arm of the actuator. The conventional HDD can have high performance, i.e., low access time to read or write data, because all of the read/write heads are located on their associated disk surfaces and available to read or write data. However, this also increases the overall height of the disk stack because the axial spacing between the disks must provide sufficient space for the slider-suspension assemblies. Also, the requirement to have a read/write head for each disk surface increases the cost of the HDD.

Figure 1A:
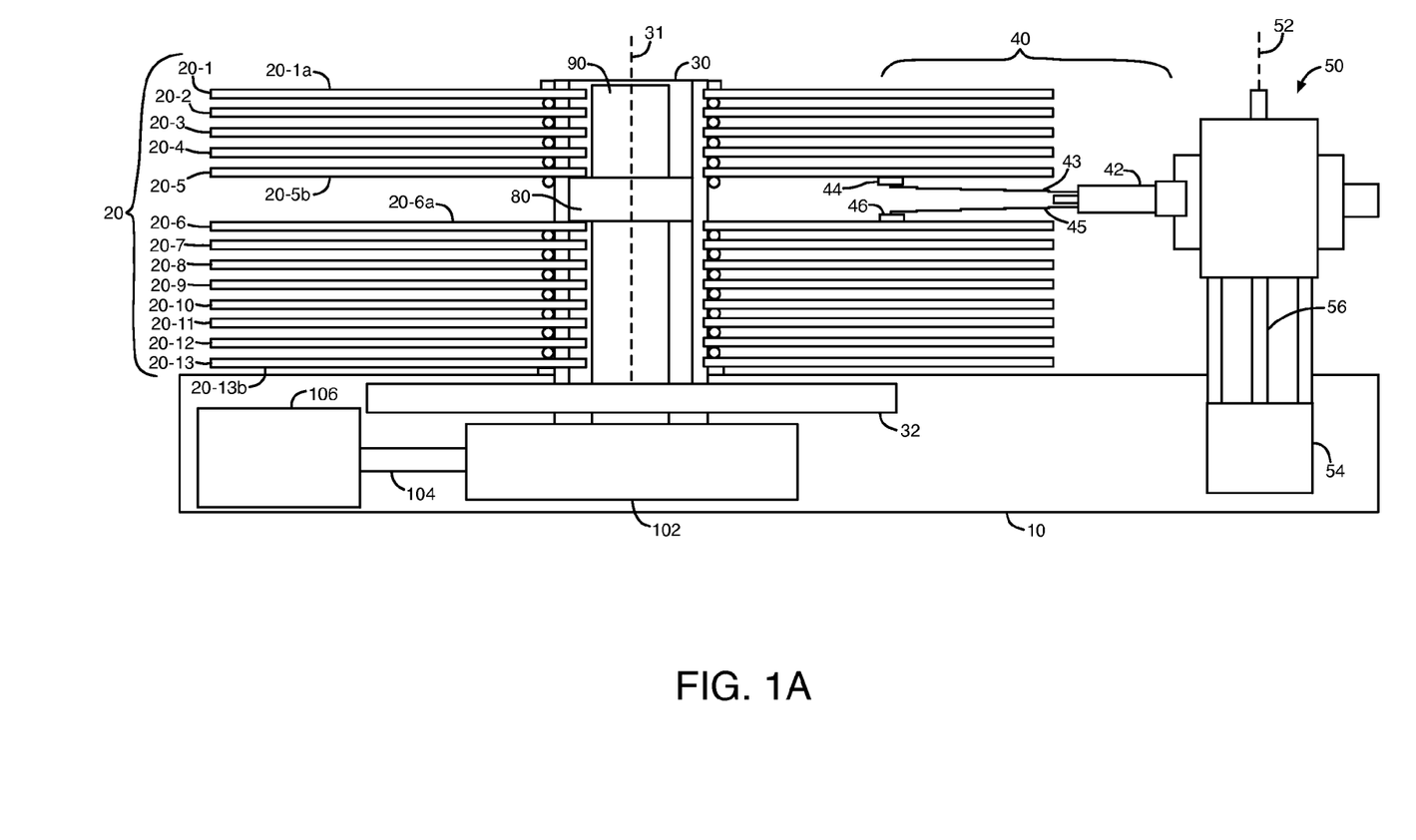
FIGS. 1A-1B illustrate side view cross-sections of an example of a hard disk drive (HDD) illustrating two different positions of the head-arm assembly in the stack of axially-movable disks, according to an embodiment of the present invention.
Figure 1B:
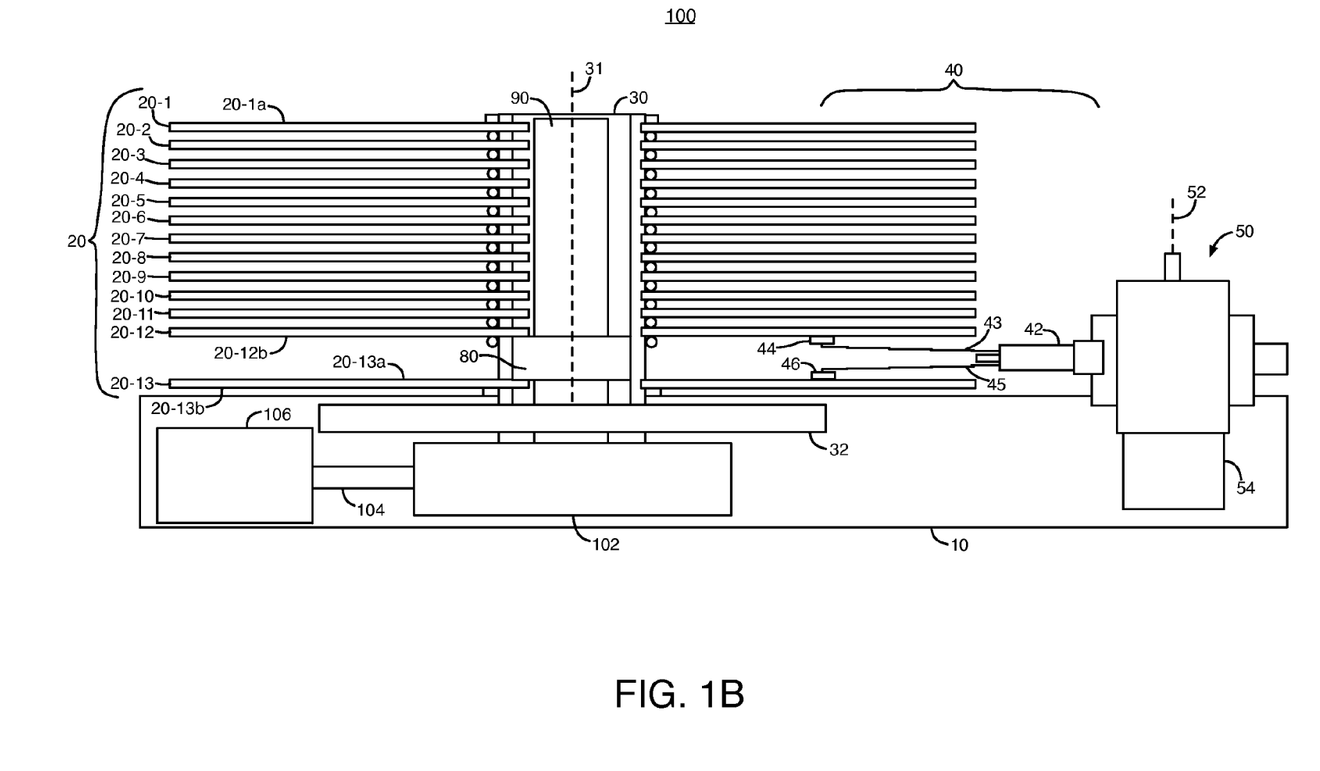

FIGS. 1A-1B illustrate side view cross-sections of a hard disk drive (HDD) 100 according to an embodiment of the present invention. HDD 100 is an apparatus. HDD 100 is also referred to as a data storage device. HDD 100 of FIGS. 1A-1B has a base 10 with a stack of disks 20 (illustrated for example as 13 disks numbered as disks 20-1 through 20-13) on a rotatable spindle 30, and a single head-arm assembly 40 that includes a rigid arm 42 and two read/write heads on respective air-bearing sliders 44, 46. One read/write head is located on air-bearing slider 44, and a second read/write head is located on air-bearing slider 46. Each read/write head can include a write element for writing data on the disks and a read element for reading data on the disks. The spindle 30 is rotated about axis 31 by spindle motor 32 in base 10. Each disk has at least one of its surfaces and preferably both surfaces containing a magnetic recording layer for the storage of data. The sliders 44, 46 are attached to the rigid arm 40 by suspensions 43, 45, respectively. The suspensions 43, 45 include flexure elements that urge the sliders toward their respective disk surfaces.

The head-arm assembly 40 is rotatable by actuator 50 about axis 52. The actuator 50 is also movable axially relative to base 10 by arm-height stepper motor 54. Arm-height stepper motor 54 is connected to the actuator 52 by a lead screw 56. The height adjustment of head-arm assembly 40 relative to base 10 is shown by its two different positions in FIGS. 1A-1B. In FIG. 1A, the head-arm assembly 40 is located within the axial gap between disks 20-5 and 20-6 with disk 20-5 having its lower data surface 20-5b accessible by the head on slider 44 and disk 20-6 having its upper surface 20-6a accessible by the head on slider 46. In FIG. 1B the head-arm assembly 40 has been moved lower and is located within the axial gap between disks 20-12 and 20-13 with disk 20-12 having its lower data surface 20-12b accessible by the head on slider 44 and disk 20-13 having its upper surface 20-13a accessible by the head on slider 46. In the embodiment shown in FIGS. 1A-1B, the top surface 20-1a of the top disk 20-1 and the bottom surface 20-13b of the bottom disk 20-13 are not used to store data.

In contrast to other hard disk drives, the disks 20 in the stack shown in FIGS. 1A-1B are not fixed in permanent positions on the spindle 30, but are movable axially up and down on the spindle 30. This feature is achieved by a disk separator 80 located inside the spindle 30, which separates any pair of axially-adjacent disks to create an axial gap. The disk separator 80 is attached to a control shaft 90 that causes disk separator 80 to rotate with the control shaft 90 but allows the disk separator 80 to move axially up and down the control shaft 90. The control shaft 90 is located inside the spindle 30 and is rotatable relative to spindle 30. A disk-stack stepper motor 106 in disk base 10 is connected to a differential rotation mechanism 102 by a differential shaft 104 and controls the rotation of control shaft 90 rotate relative to the rotation of spindle 30.

Because the head-arm assembly 40 is movable axially by arm-height stepper motor 54, the sliders 44, 46 can be rotated radially inside the different axial gaps created by different pairs of separated disks. This allows all the disks, except for the pair whose surfaces are being accessed by the heads on sliders 44, 46, to be spaced very closely together to achieve a higher volumetric efficiency than conventional HDDs. For the head-arm assembly 40 to move from the position in FIG. 1A to the position in FIG. 1B, assembly 40 is first rotated out of the axial gap between disks 20-5 and 20-6 and beyond the outer circumference of the disk stack. This is achieved by a head support (not shown in FIGS. 1A-1B) that also moves axially with the head-arm assembly 40 but does not rotate with it.

This type of head support may be a conventional "load/unload" (L/UL) ramp structure onto which the sliders are "unloaded" off the disk and then later "loaded" onto the disks. After the sliders 44, 46 have been rotated out of the axial gap between disks 20-5 and 20-6 in FIG. 1A and unloaded off disk surfaces 20-5b, 20-6a onto the L/UL ramps, the disk separator 80 creates the new axial gap between disks 20-12 and 20-13 in FIG. 1B. The sliders 44, 46 are then moved off the L/UL ramps and loaded onto the disk surfaces 20-12b, 20-13a in FIG. 1B where they can be rotated across the disk surfaces in the newly-selected axial gap.

Figure 2:
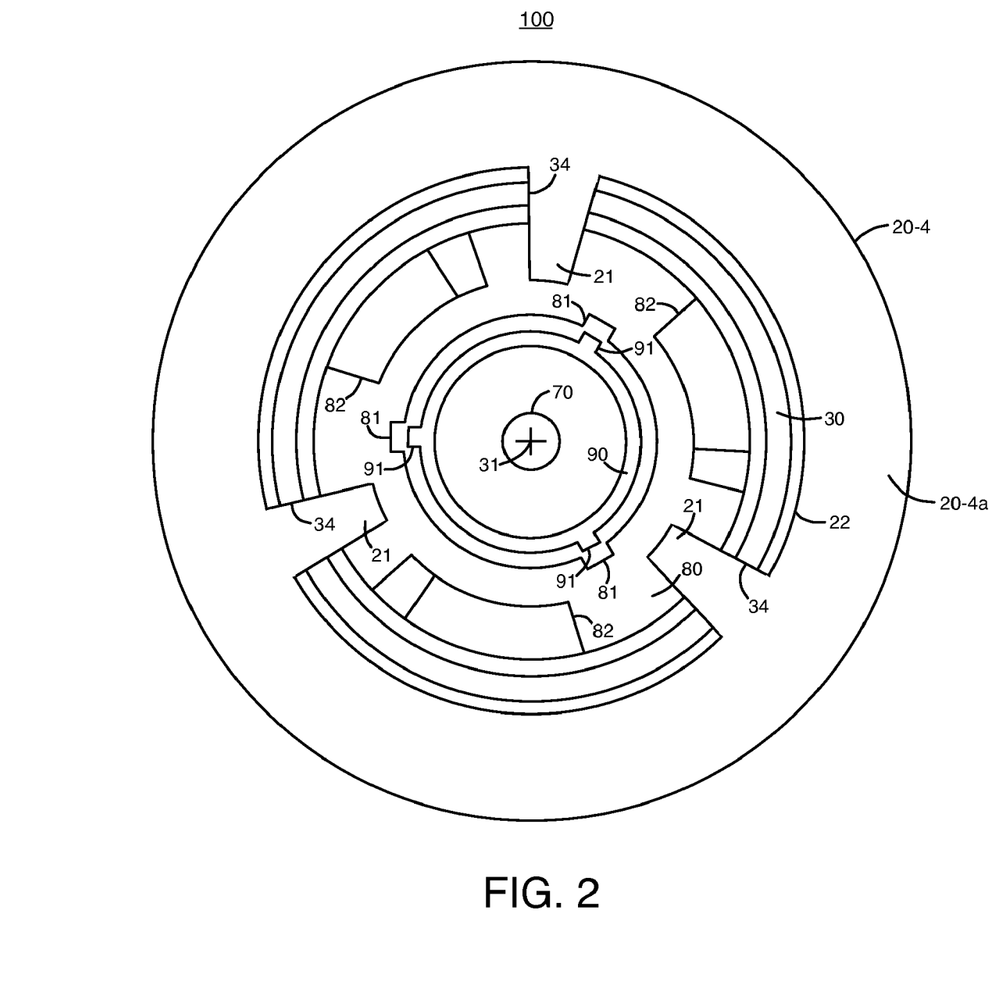
FIG. 2 is a top sectional view of the inside of the spindle taken through a section between two disks for illustrating the control shaft and disk separator for shifting disks in the disk stack in an embodiment of the HDD according to the present invention.

FIG. 2 is a top sectional view of the inside of spindle 30 of drive 100 taken through a section between disks 20-4 and 20-5. Each disk, like disk 20-4, has a plurality of fingers or tabs 21 that project radially inwardly near the radially inner edge 22 of the disk. The spindle 30 is a hollow structure with longitudinal or axially-directed slots 34 into which the disk tabs 21 are inserted. The disks are arranged on the slotted spindle 30 so that the tabs 21 protrude through the wall of the slotted spindle 30 into the inside of the hollow spindle 30. Inside the spindle 30 is a fixed rod 70 attached to the disk drive base 10 (FIGS. 1A-1B). The center of rod 70 defines the axis 31 about which the spindle 30 rotates. The inside of the spindle 30 also contains the disk separator 80 and rotatable control shaft 90. The control shaft 90 is rotatable about axis 31 and is rotatable relative to rotatable spindle 30. The control shaft 90 includes longitudinal or axially-directed splines 91 and the disk separator includes longitudinal or axially-directed slots or keyways 81 for the splines 91. The splines 91 located in keyways 81 allow the disk separator 80 to move axially along the control shaft 90 but cause the disk separator 80 to rotate together with control shaft 90. FIG. 2 also shows the upper barbs 82 on the upper surface of disk separator 80. The upper barbs 82 engage the tabs 21 on disk 20-4 when disk separator 80 is rotated counterclockwise in the manner explained more fully below.

Figure 3:
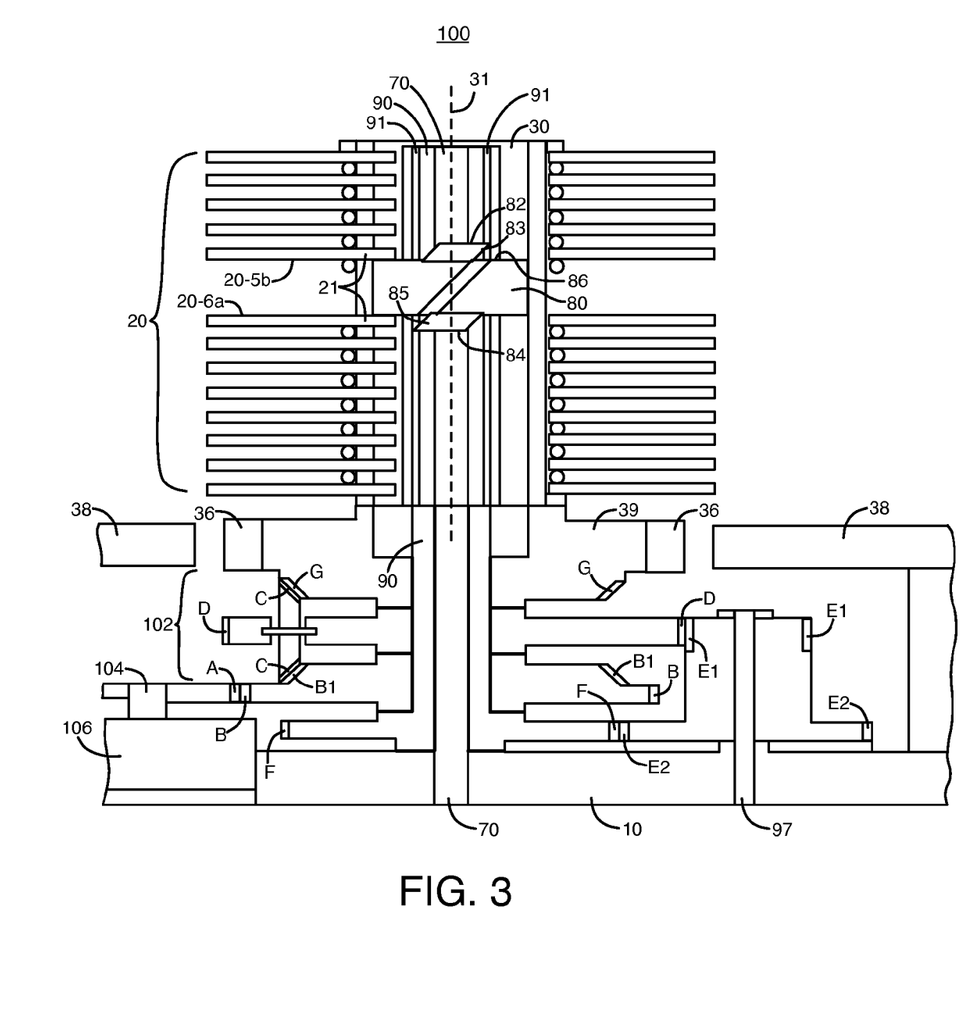
FIG. 3 is a sectional view through the disk stack and spindle for illustrating the operation of the disk separator in an embodiment of the HDD according to the present invention.

FIG. 3 is a sectional view through the disk stack 20 and spindle 30 of drive 100 that illustrates the operation of disk separator 80. FIG. 3 shows one of the tabs 21 on each disk inserted in a slot 34 of the spindle 30. The disk separator 80 rotates with the control shaft 90. However, disk separator 80 is free to slide up and down on the control shaft 90 by virtue of the vertical splines 91 which mate with vertical keyways 81 on the inner radial surface disk separator 80, as shown in FIG. 2. When the spindle 30 is rotating in a steady state, i.e., not in the act of moving any disks up or down, all three tabs 21 on the disks immediately above and below the disk separator 80 rest against the upper and lower surfaces of the disk separator 80. In the steady state, the control shaft 90 and spindle 30 are rotated at the same angular velocity, i.e., no relative rotation between the spindle 30 and control shaft 90.

The disk separator 80 has three equally angularly spaced barb structures on its upper and lower surfaces. Only one pair of barbs, one upper barb 82 and one lower barb 84, is shown for simplicity in FIG. 3. There are helical slots on the outer surface of disk separator 80, as shown by slot 86 between upper barb 82 and lower barb 84. The helical slot defines inclined cam surfaces or ramps 83, 85. The slots extend only partially through the radial thickness of the disk separator 80 but are radially wide enough to accommodate the tabs 21 of the disks. When the control shaft 90 is rotated relative to the spindle 30 by ⅓rd of a complete turn, a disk is transferred up or down in the stack. This can be understood by considering the case of rotating the control shaft 90 with the spindle 30 not rotating. If the control shaft is rotated clockwise so that the lower barb 84 in FIG. 3 moves to the left, the lower barb 84 will engage the tab 21 on disk 20-6 immediately to the left of the barb 84, and the tab 21 will travel through the slot 86. Simultaneously, the left edge of the upper barb 82 will engage the tab 21 of the disk 20-5 above the disk separator 80 immediately to the left of the upper barb 82. As the control shaft 90 is rotated, two things will occur: the disk separator 80 will move downward by one disk spacing and the disk immediately below the disk separator 80 will move upward to join the stack of disks above the disk separator 80. When the ⅓rd rotation of the control shaft 90 is completed, the axial gap between the pair of separated disks will have moved downward by one disk. While only one pair of barbs 82, 84 are shown in FIG. 3, there are three tabs on each disk, three pairs of upper and lower barbs on the disk separator 80, and three helical slots 86. The sequence of events described above occurs simultaneously for all three tabs on both disks (the disks immediately above and below the disk separator 80), and for all three pairs of barbs. Because all three tabs are engaged simultaneously by the barbs, the disk 20-6 is held level while it is being raised to join the disks above the disk separator 80.

Rotation of the control shaft 90 in the other direction (counterclockwise) relative to the spindle 30 will move disk 20-5 from above disk separator 80 to below disk separator 80. Thus, the disks can be moved axially in either direction. Also, any two axially-adjacent disks can be separated to create an axial gap by merely rotating the control shaft in the correct direction by a selected amount of rotation. For example, rotation of control shaft 90 two complete turns will shift 6 disks from below the disk separator 80 to above the disk separator 80, so that the axial gap will be created between disks 20-11 and 20-12.

For ease of explanation, the above explanation of the operation of disk separator 80 was made for the case when the spindle 30 is stopped with a ⅓rd rotation applied to the control shaft 90. However, the same axial shifting of the disks can be achieved while the spindle 30 is rotating at its normal operating speed. In this steady state, the spindle 30 and control shaft 90 rotate together. By temporarily slowing down or speeding up the control shaft rotation speed relative to the spindle rotation, the disks can be raised or lowered. For each ⅓rd turn of relative rotation between the control shaft 90 and the spindle 30, one disk will move up or down, depending on the direction of relative rotation of the control shaft 90.

FIG. 3 also illustrates the connection of the spindle 30 and control shaft 90 to base 10 and to the differential rotation mechanism 102. The central fixed rod or shaft 70 is mounted to base 10. The control shaft 90 is rotatable about the fixed shaft 70 by a fluid bearing (represented by the solid black line between fixed shaft 70 and rotatable control shaft 90). The hollow spindle 30 is also rotatable about control shaft 90 by a fluid bearing (represented by the solid black line between spindle 30 and rotatable control shaft 90). The outer wall of spindle 30 supports a permanent magnet assembly 36. The spindle motor on base 10 is a brushless DC motor that includes a coil assembly 38 that interacts with the permanent magnet assembly 36 to rotate the attached spindle 30 about axis 31.

The controllable rotation of the control shaft 90 relative to the spindle 30 is achieved by the use of a differential rotation mechanism 102. In FIG. 3, there are four bodies that can rotate freely with respect to one another, but all have the fixed central shaft 70 with central axis 31 as their common axis of rotation. These are the spindle 30 with hub 39 and bevel gear G, gear D, gear B, and control shaft 90 with gear F. The spindle 30 has a hub 39 with a lower bevel gear G. Gear D rotates around control shaft 90 by a fluid bearing (shown as solid black line) and has a small bevel gear C rotating on a short shaft which is fixed within an opening in gear D. Gear B rotates around control shaft 90 by a fluid bearing (shown as solid black line) and is coupled to gear A, which is mounted on the differential shaft 104 of the disk stack stepper motor 106. Gear B includes bevel gear B1. Gear F is rigidly attached to control shaft 90. The bevel gear C engages the teeth on bevel gear G of spindle hub 39 and the teeth on bevel gear B1 on gear B. The spindle hub 39 with bevel gear G, the gear B with bevel gear B1, and the bevel gear C mounted on gear D together function like a conventional differential gear mechanism, like that used in automobile drive trains. While fluid bearings are illustrated in FIG. 3, ball bearings or other types of bearing systems may be used.

The differential rotation mechanism 102 also includes a transfer gear E with gear E1 at a smaller outer diameter and gear E2 at a larger outer diameter. Gear E is rotatable about fixed shaft 97 mounted on base 10. Gear D engages gear E1 and gear F engages gear E2. In this embodiment the diameter of E2 is exactly two times the diameter of E1.

When the disk drive is running normally, i.e., the spindle 30 and hub 39 rotating but no shifting of disks axially, the stepper motor 54 is stationary, so gears A and B are stationary. The rotation of spindle hub 39, which is coupled to bevel gear 30 via gear G, causes gear D to rotate at half the rotation rate of the spindle hub 39, and in the same direction as the spindle hub 39. The rotation of gear D, which is coupled to gear E1 on transfer gear E, causes rotation of transfer gear E. The rotation of transfer gear E causes rotation of control shaft 90 via gear E2, which is coupled to gear F. The gear ratios of gear D, gear E1, gear E2, and gear F are selected so that gear F rotates at exactly twice the speed of gear D, and in the same direction as gear D. Since gear D is rotating at half the speed of the spindle hub 39, gear F and the control shaft 90 to which it is attached rotate at exactly the same speed as the spindle hub 39.

If the stepper motor 106 is now rotated, gear A on differential shaft 104 will rotate and cause gear B to rotate. If gear B rotates in the same direction as the spindle hub 39, gear D, which is coupled to bevel gear B1 on gear B via bevel gear C, will speed up and rotate faster than half the speed of the spindle hub 39. If gear B rotates in the opposite direction of the spindle hub 39, gear D will slow down and rotate at less than half the speed of the spindle hub 39. In this manner, rotation of the control shaft 90 relative to the spindle hub 39 can be achieved, resulting in movement of the disk separator 80 axially up or down, as explained above. The amount of relative rotation between control shaft 90 and spindle 30 is equal to the amount of rotation imparted on gear B by the stepper motor 106. In the example described above, a ⅓rd rotation of the control shaft 90 relative to the spindle 30 is needed to raise or lower one disk in the stack, so a ⅓rd rotation of gear B by the stepper motor 106 will accomplish this. Thus, by rotating the disk-stack stepper motor 106 by ⅓ of a revolution, a disk can be raised or lowered, depending on the direction of rotation of the disk-stack stepper motor 106.

Further details of a hard disk drive with a disk separator for creating axial gaps between disks for access by read/write heads are described in commonly assigned, co-pending U.S. patent application Ser. No. 12/248,117, filed Oct. 9, 2008 by Thomas Albrecht et al., which is incorporated by reference herein in its entirety.

Hard disk drives are typically viewed as near random access devices. Data is stored as a magnetic image on the surfaces of one or more disks. The data is accessed using addresses such as cylinder head sector (CHS) numbers or logical block addresses (LBAs).

According to an embodiment of the present invention, the disk drive 100 of FIGS. 1A-1B is used for applications that are currently being applied to massive arrays of idle disks (MAID) and magnetic tape storage devices, such as storing archived data that does not require a fast access time. Disk drive 100 has a much higher data density and a faster access time than magnetic tape storage devices. Disk drive 100 also has a much higher data density than a MAID device that has the same number of read/write heads and writable disk surfaces (i.e., one head for each writable disk surface). Because disk drive 100 has only two read/write heads and many more disks (e.g., 13), disk drive 100 can pack more disks into the same volume of space than a standard MAID device.

As described above, only two writable surfaces of disks 20 in disk drive 100 are accessible by the read/write heads in the axial gap at any one time. In response to a command from a host operating system to switch platters, disk drive 100 causes another two of the writable surfaces of disks 20 to be accessible by the read/write heads in the axial gap at a subsequent time. As such, disk drive 100 is suitable for storing archived data that does not require having a high-speed random data access time.

According to another embodiment of the present invention, disk drive 100 responds to instruction sets that are used by write-once read-many (WORM) devices, such as tape backup devices. Commands sent to disk drive 100 can toggle disk drive 100 from normal operation to WORM operation. During WORM operation, disk drive 100 can write data in each writable data sector on disks 20 only one time, but the stored data in each data sector can be read as many times as desired. Also, during WORM operation, many typical data storage device commands are no longer supported. Normal operation refers to the ability of disk drive 100 to write and read randomly at any data sector on any of the disks 20 in a non-sequential manner (e.g., a write to disk 20-1 followed by a write to disk 20-10 followed by a write to disk 20-4).

Disk drive 100 can support Small Computer System Interface (SCSI) sequential-access device commands when functioning as a write-once read-many (WORM) device. For example, disk drive 100 can support SCSI stream commands, SCSI primary commands, and SCSI media changer instructions, such as the position-to-element instruction.

According to another embodiment of the present invention, disk drive 100 responds to instruction sets that are used by write append, read randomly devices, such as tape stack storage devices. In one embodiment, a tape stacking protocol is used to manage the data stored on the stack of disks in the data storage device of FIGS. 1A-1B.

Disk drive 100 can, for example, be a drop in replacement for a tape stacker unit that responds to the same software commands as the tape stacker unit. In this example, disk drive 100 receives commands from a host operating system that are intended to control a tape stacker unit. Disk drive 100 has firmware that converts the commands from the host operating system into read and write commands that can be recognized and processed by standard hard disk drive firmware. The commands from the host operation system can be, for example, standard SCSI commands.

According to the tape stacking protocol, the disk drive 100 treats the disks in the stack as write append, read randomly data storage media. Disk drive 100 can store data on the writable surfaces of disks 20 in a write append fashion. Write append refers to writing data on a data storage medium or a data storage device in a sequential manner, as opposed to a random manner. For example, each single disk of the multiple disk stack can be treated as an individual tape using the SCSI tape stacker protocol.

Data sectors on a surface of a magnetic disk are usually addressed in a sequential manner that is related to the physical location of the data sectors on the disk surface. According to an embodiment, when data is written onto a data track of a disk surface in a sequential manner, the data storage device writes each additional block of data in a data sector on the disk that is physically adjacent to a data sector that data was previously written to the data track, until the data track is full. When a data track is full of data, the data storage device begins writing on the next adjacent data track in a sequential manner, storing each additional block of data in a data sector that is physically adjacent to the previously written data sector. This process continues until the disk is full of data.

In disk drive 100, only two of the writable disk surfaces in the stack are accessible for writing and reading data at any one time. In the write append embodiment, the disk drive 100 begins by forming an axial gap between the first and the second disks in the stack using the disk separator 80, as described above. Then, disk drive 100 writes data on the lower surface of the first disk in the stack (i.e., disk 20-1) and the upper surface of the second disk in the stack (i.e., disk 20-2). When these disk surfaces are full such that no additional data can be stored on them, disk drive 100 repositions the disks using disk separator 80 and the read/write heads as described above such that the lower surface of the second disk and the upper surface of the third disk in the stack are accessible by the read/write heads in the axial gap. Disk drive 100 then writes data on these two disk surfaces. When these disk surfaces are full, disk drive 100 then repositions the disks using disk separator 80 and the read/write head such that the lower surface of the third disk and the upper surface of the fourth disk in the stack are accessible by the read/write heads in the axial gap. Disk drive 100 then writes data on these two disk surfaces. This process repeats until data has been stored on all of the writeable surfaces of the disks in the stack.

When all of the writable surfaces of the disks are full and cannot store additional data, disk drive 100 begins to write additional data on the disks 20 by overwriting the previously written data, beginning with the first two disks in the stack. Disk drive 100 repositions the disks using disk separator 80 and the read/write heads such that the lower surface of the first disk in the stack and the upper surface of the second disk in the stack are again accessible by the read/write heads in the axial gap. Disk drive 100 then writes new data on these disk surfaces by overwriting the data that was previously written on these disk surfaces. When these disk surfaces are full such that no additional data can be stored on them, disk drive 100 repositions the disks using disk separator 80 and the read/write heads such that the lower surface of the second disk and the upper surface of the third disk in the stack are accessible by the read/write heads in the axial gap. Disk drive 100 then writes data on these two disk surfaces by overwriting previously written data. This process repeats until data has been written onto all of the writeable surfaces of the disks in the stack a second time. Each time that all of the writable surfaces of the disks in the stack are full of data, disk drive 100 overwrites old data stored on the writable surfaces of the disks with new data beginning with the first and the second disks in the stack, as described above.

Firmware in disk drive 100 prevents the hard disk drive from overwriting data that was previously written on other disks in the stack until all of the writable surfaces of the disks are full and cannot store additional data. However, disk drive 100 can reposition the read/write heads to read data stored on any of the surfaces of the disks in the stack in a random access manner. Thus, disk drive 100 can be configured to randomly read data from data sectors on any of disks 20 in a non-sequential manner (in any order) without regard to the physical location of the data sectors being accessed. Thus, the write append embodiment of disk drive 100 can function as a write-once read-many (WORM) device.

According to another embodiment of the present invention, hard disk drive 100 can also use shingled writing principles to write data onto the magnetically writable surfaces of disks 20. Blocks of data on adjacent tracks that are written onto a magnetic hard disk using shingled writing principles overlap each other on the magnetic hard disk. By overlapping blocks of data typically much higher track density can be achieved, up to two times compared to conventional recording. However, a track of data stored on the surface of a magnetic hard disk using shingled writing principles cannot be overwritten without also overwriting data stored on an adjacent track, which creates a constrained HDD.

Figure 4:
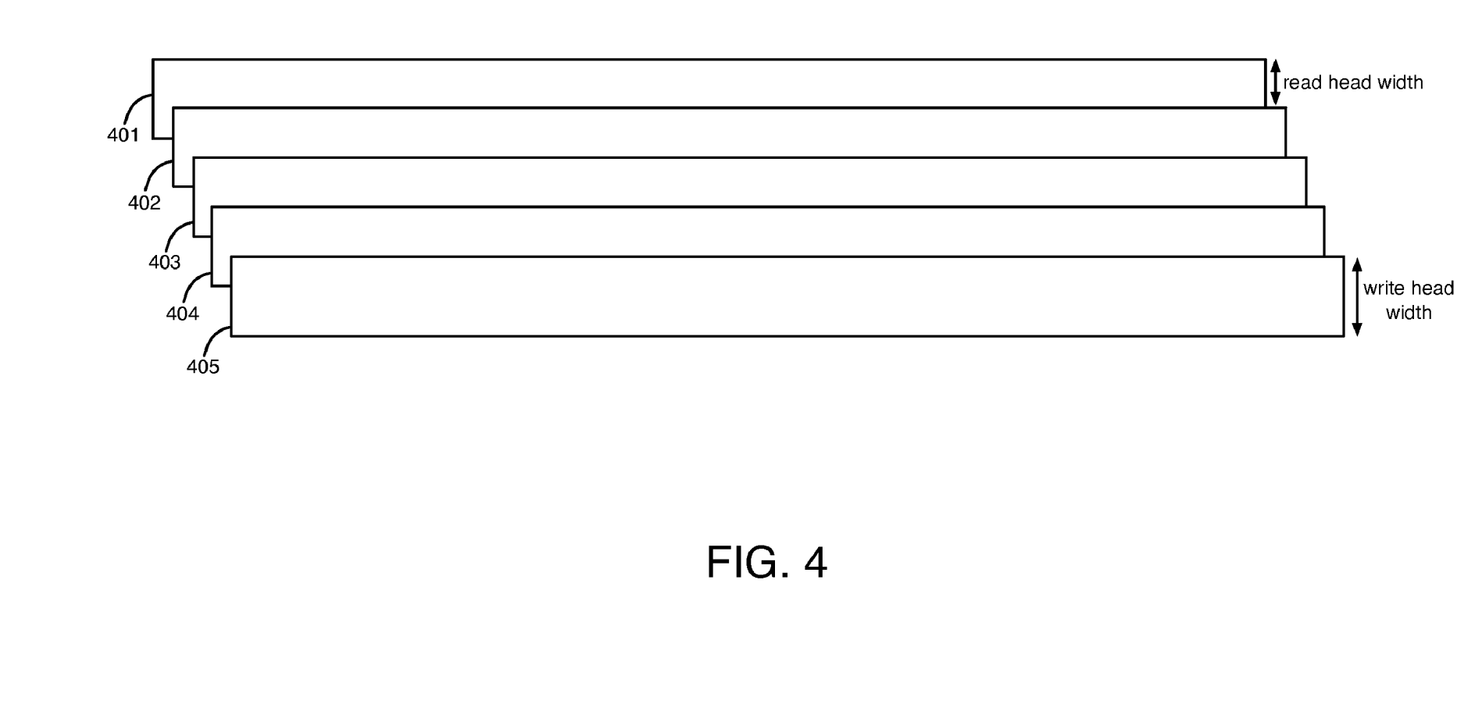
FIG. 4 illustrates an example of concentric circular tracks on a magnetic hard disk that were written by a write element in a hard disk drive using shingled recording, according to an embodiment of the present invention.

FIG. 4 illustrates an example of 5 concentric circular magnetic tracks of data on a hard disk that were written by a write element in a hard disk drive using shingled recording, according to an embodiment of the present invention. In FIG. 4, a first data track 401 is overlapped by a second data track 402 that is immediately adjacent (i.e., contiguous) to the first data track 401, just to the inside of the first track 401, when data is written to the second data track 402. In turn, when data is written to a third data track 403 that is contiguous to the second data track 402, the second data track 402 is overlapped by the third track 403. Similarly, when data is written to a fourth data track 404 that is contiguous to the third data track 403, the third data track 403 is overlapped by the fourth track 404. When data is written to a fifth data track 405 that is contiguous to the fourth data track 404, the fourth data track 404 is overlapped by the fifth track 405. If the fifth track 405 is the last track, it is not overlapped by any other track. The pattern of overlapping may be reversed, i.e., the first track 401 might overlay, instead of underlay, the second track 402, and so on. While only five data tracks are shown for clarity of disclosure, a magnetic disk can contain many more data tracks. Each of the tracks 401-405 contains multiple blocks (e.g., sectors) of data.

As also shown in FIG. 4, the width of the write element shown is larger than the track pitch, which is essentially the non-overlapped portion of the width of a data track. The width of the read element is slightly less than the track pitch, so that the read element reads only signals from a single track. With the relatively wide write element width and physical thickness, the write element can generate higher fields at the disk, allowing disk coercivities to increase, grain sizes to decrease, and resulting in increased overall recording density.

An example of a hard disk drive that uses shingled writing principles is described in U.S. Pat. No. 6,967,810, to Kasiraj et al., issued Nov. 22, 2005, which is incorporated by reference herein in its entirety. Another example of a hard disk drive that uses shingled writing principles is described in U.S. Pat. No. 6,185,063, to Cameron, issued Feb. 6, 2001, which is incorporated by reference herein in its entirety.

According to an example of a shingled writing embodiment, the operation of disk drive 100 is constrained to only writing data in a sequential manner on the writable surface of each of the disks 20 in the stack. When disk drive 100 is constrained to only writing data sequentially on each writable disk surface, data can be written onto the writable surfaces of disks 20 using a shingled writing principle. As a result, previously written blocks of data on a particular writable disk surface cannot be overwritten until disk drive 100 is instructed to begin overwriting all of the data on that disk surface. Therefore, adjacent blocks of data on the surface of a particular disk are not overwritten, until disk drive 100 begins the process of overwriting all of the blocks of data on that disk surface in a sequential manner. In this embodiment, data can be read from the writable surface of any of the disks in the stack in a random and non-sequential manner.

Embodiments of the present invention can be applied to hard disk drives, such as HDD 100. Embodiments of the present invention can also be applied to non-magnetic disk drives including optical disk drives, such as compact disc (CD) drives and digital video disc (DVD) drives.

Figure 5:
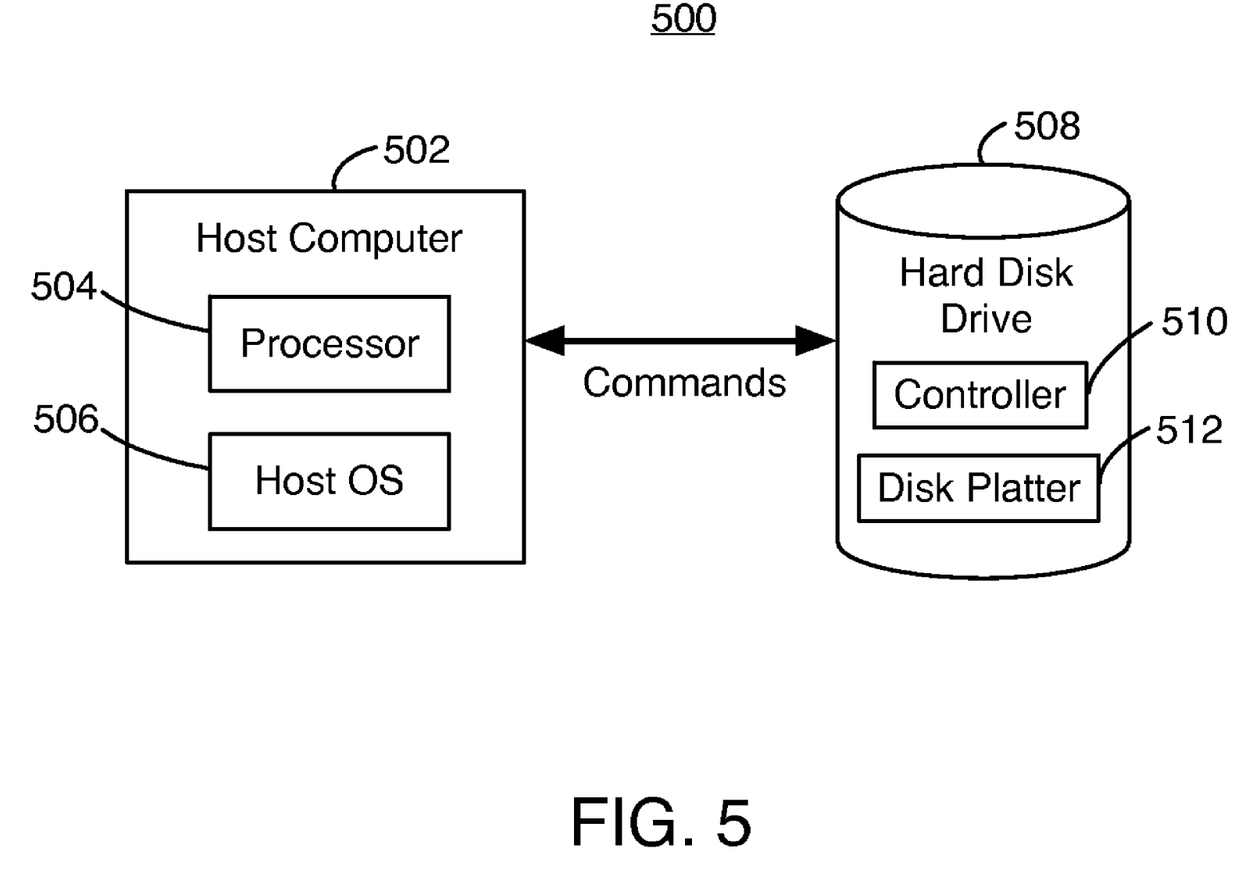
FIG. 5 is a block diagram that illustrates a system having a host computer and a hard disk drive, according to an embodiment of the present invention.

FIG. 5 is a block diagram that illustrates a system 500, according to an embodiment of the present invention. System 500 includes a host computer 502. Host computer 502 includes a processor 504 and a host operating system 506. System 500 also includes a data storage device, such as a hard disk drive 508. Hard disk drive 508 includes a controller circuit 510 and disk platter 512. Controller circuit 510 can be fabricated on one or multiple integrated circuit dies. For ease of illustration, only the controller circuit 510 and disk platter 512 of hard disk drive 508 are shown.

Hard disk drive 508 may also include other components such as read/write heads, a head actuator mechanism, a spindle motor, etc. Host computer 502 may be a digital video recorder (DVR), set-top-box (STB), or any other type of computer system, such as an embedded system, a minimalistic system, hand-held device or computer, etc. While the controller circuit 510 is shown residing on the hard disk drive 508, the controller 510 may reside in any suitable location, separate from hard disk drive 508 (e.g., on host 502, etc.).

In operation, host operating system 506 in host computer 502 sends commands to hard disk drive 508. Based on the commands, hard disk drive 508 performs requested functions such as reading data, writing data, erasing data, etc. on disk platter 512 and other disk platters in hard disk drive 508.

According to some embodiments of the present invention, hard disk drive 508 is a constrained hard disk drive as described above. For example, controller circuit 510 can cause the read/write heads in drive 508 to record data on the writable surfaces of disk platter 512 and other disk platters using a shingled writing technique. Controller circuit 510 can also cause read/write heads in drive 508 to store data on writable surfaces of disk platter 512 and other disk platters in a write append format. Controller circuit 508 can also confine hard disk drive 508 to continue storing data on the writable surface of disk platter 512 until the writable surface of the disk platter is full, before writing data on another writable surface in hard disk drive 508. As yet another example, controller circuit 510 can be configured to convert tape stacker unit access commands from host operating system 506 into read, write, and erase commands for hard disk drive 508.

The foregoing description of the exemplary embodiments of the present invention has been presented for the purposes of illustration and description. It is not intended to be exhaustive or to limit the present invention to the examples disclosed herein. In some instances, features of the present invention can be employed without a corresponding use of other features as set forth. Many modifications, changes, and variations are possible in light of the above teachings, without departing from the scope of the present invention. It is not intended that the scope of the present invention be limited with this detailed description. For example, embodiments of the present invention can be implemented using one or a combination of hardware, software, and a computer-readable medium containing program instructions. Embodiments of the present invention can be embodied as program code stored on a computer readable medium that can be run on a computer. Software implemented by embodiments of the present invention and results of the present invention can be stored on a computer-readable medium such as semiconductor memory, hard disk drive, compact disc (CD), digital video disc (DVD), or other media. Results of the present invention can be used for various purposes such as being executed or processed by a processor, being displayed to a user, transmitted in a signal over a network, etc. Embodiments of the present invention may also be embodied as a computer readable program code unit stored on a computer readable medium, for causing a number of computer systems connected via a network to affect distributed processing.

What is claimed is:

1. A disk drive apparatus comprising:
   disks in a stack on a spindle, each of the disks having at least one writable surface;
   a control shaft inside the spindle and rotatable relative to the spindle about a spindle axis of rotation;
   a disk separator in the spindle and movable axially on the control shaft for separating selected axially-adjacent disks in the stack, wherein the disk separator rotates to create an axial gap between the selected axially-adjacent disks;
   a head-arm assembly comprising at least one read/write head, the head-arm assembly being movable to enable the read/write head to access a writable surface of a first disk of the axially-adjacent disks; and
   a controller circuit that confines the read/write head to recording data on the writable surface of the first disk in a write append format.

2. The disk drive apparatus defined in claim 1 wherein the disk drive apparatus causes the read/write head to record data on the writable surface of the first disk using shingled writing.

3. The disk drive apparatus defined in claim 1 wherein the controller circuit confines the disk drive apparatus to continue storing data on the writable surface of the first disk until the writable surface of the first disk is full, before writing data on another writable surface in the disk drive apparatus.

4. The disk drive apparatus defined in claim 1 wherein the controller circuit is configured to convert tape stacker unit access commands from a host operating system into read and write commands for the disk drive apparatus.

5. A disk drive apparatus, comprising:
disks in a stack on a spindle, each of the disks having at least one writable surface;
a control shaft inside the spindle and rotatable relative to the spindle about a spindle axis of rotation;
a disk separator in the spindle and movable axially on the control shaft for separating selected axially-adjacent disks in the stack, wherein the disk separator rotates to create an axial gap between the selected axially-adjacent disks; and
a head-arm assembly comprising an arm and at least two read/write heads attached to the arm, the head-arm assembly being movable into the axial gap to enable the read/write heads to access opposing writable surfaces of at least two of the disks,
wherein the disk drive apparatus is configured to access only the writable surfaces of the disks that are accessible within the axial gap, the writable surfaces accessible within the axial gap being less than all of the writable surfaces in the stack, and
wherein the disk drive apparatus is configured to store data on the writable surfaces of the disks in a write append format.

6. The disk drive apparatus defined in claim 5 wherein the disk drive apparatus stores data on each of the writable surfaces of the disks using shingled writing.

7. The disk drive apparatus defined in claim 5 wherein the disk drive apparatus is configured to overwrite data previously stored on the disks in the stack only when the writable surfaces of all of the disks in the stack are full of data.

8. The disk drive apparatus defined in claim 5 wherein the disk drive apparatus is configured to convert tape stacker unit access commands from a host operating system into read and write commands for a disk drive.

9. The disk drive apparatus defined in claim 5 wherein the disk drive apparatus writes data on a writable surface of an adjacent disk in the stack each time that the writable surfaces accessible within the axial gap are full of data.

10. The disk drive apparatus defined in claim 5 wherein the disk drive apparatus is configurable to operate in write-once read-many mode.

11. The disk drive apparatus defined in claim 5 wherein the disk drive apparatus is configured to process small computer system interface commands received from a host operating system.

12. A disk drive apparatus, comprising:
disks in a stack on a spindle, each disk having at least one writable surface for the storage of data;
a control shaft inside the spindle and rotatable relative to the spindle about a spindle axis of rotation;
a disk separator in the spindle and movable axially on the control shaft for separating selected axially-adjacent disks in the stack, wherein the disk separator rotates to create an axial gap between the selected axially-adjacent disks; and
a head-arm assembly comprising an arm and at least one read/write head attached to the arm, the head-arm assembly being movable into the axial gap to enable the read/write head to access tracks on a surface of one of the axially-separated disks,
wherein the disk drive apparatus has only enough read/write heads to read data from and write data to the writable surfaces that are accessible within the axial gap at any one time, the writable surfaces accessible within the axial gap being less than all of the writable surfaces in the stack, and
wherein the disk drive apparatus is configured to continue storing data on the writable surfaces of the disks accessible within the axial gap until the writable surfaces accessible within the axial gap are full, before writing data on another writable surface in the stack.

13. The disk drive apparatus defined in claim 12 wherein the disk drive apparatus sequentially stores data in data sectors on each of the writable surfaces of the disks using shingled writing.

14. The disk drive apparatus defined in claim 12 wherein the disk drive apparatus is configured to overwrite data previously stored on the disks in the stack only when the writable surfaces of all of the disks in the stack are full of data.

15. The disk drive apparatus defined in claim 12 wherein the disk drive apparatus is configured to read data on the writable surfaces of the disks in a read randomly format.

16. The disk drive apparatus defined in claim 12 wherein the disk drive apparatus is a magnetic hard disk drive.

17. The disk drive apparatus defined in claim 12 wherein the disk drive apparatus is configured to convert tape stacker unit access commands from a host operating system into read and write commands for a disk drive.

18. The disk drive apparatus defined in claim 12 wherein the disk drive apparatus is configured to support small computer system interface sequential-access device commands received from a host operating system.

19. A disk drive apparatus comprising:
disks in a stack on a spindle, each of the disks having at least one writable surface;
a control shaft inside the spindle and rotatable relative to the spindle about a spindle axis of rotation;
means for separating selected axially-adjacent disks that is movable axially on the control shaft and movable with respect to the spindle to separate any two of the axially-adjacent disks in the stack, each pair of axially-adjacent disks defining an axial gap in the stack when the disks in a pair are separated by the means for separating, wherein the means for separating rotates to create the axial gap between each pair of axially-adjacent disks;
means for reading and writing data on the writable surfaces of the disks in the stack, the means for reading and writing data being movable into the axial gap to enable access to opposing writable surfaces of at least two of the disks within the axial gap,
wherein the disk drive apparatus only accesses data on the writable surfaces from within the axial gap, the writable surfaces accessible from within the axial gap being less than all of the writable surfaces in the stack; and
means for confining the disk drive apparatus to continuing to store data on the writable surfaces of the disks accessible within the axial gap until the writable surfaces accessible within the axial gap are full, before writing data on another writable surface in the stack.

20. The disk drive apparatus defined in claim 19 wherein the disk drive apparatus sequentially stores data in data sectors on each of the writable surfaces of the disks using shingled writing.

21. The disk drive apparatus defined in claim 19 wherein the disk drive apparatus is configured to store data on the writable surfaces of the disks in a write append format.

* * * * *